United States Patent
Frederickson et al.

(10) Patent No.: US 6,226,343 B1
(45) Date of Patent: May 1, 2001

(54) WATER ROD IN A FUEL ASSEMBLY OF A BOILING WATER NUCLEAR REACTOR

(75) Inventors: Christian D. Frederickson, Wilmington; Harold B. King, Wrightsville Beach, both of NC (US)

(73) Assignee: General Electric Company, Schenectady, NY (US)

(*) Notice: Subject to any disclaimer, the term of this patent is extended or adjusted under 35 U.S.C. 154(b) by 564 days.

(21) Appl. No.: 08/839,193

(22) Filed: Apr. 23, 1997

Related U.S. Application Data

(63) Continuation of application No. 08/542,253, filed on Oct. 12, 1995, now abandoned.

(51) Int. Cl.[7] .................................................. G21C 3/32
(52) U.S. Cl. ........................ 376/444; 376/440; 376/446
(58) Field of Search .................................. 376/440, 327, 376/353, 443, 444, 352, 446

(56) References Cited

U.S. PATENT DOCUMENTS

| | | |
|---|---|---|
| 3,015,616 | 1/1962 | Sturtz et al. . |
| 3,197,381 | 7/1965 | Blake . |
| 3,344,036 | 9/1967 | Haslam et al. . |
| 3,366,546 | 1/1968 | Anthony et al. . |
| 3,395,077 | 7/1968 | Long Sun Ton et al. . |
| 3,607,639 | 9/1971 | Hokasen et al. . |
| 3,697,376 | 10/1972 | Mefford et al. . |
| 3,725,199 * | 4/1973 | Notari et al. .................. 326/444 |
| 3,828,868 * | 8/1974 | Jabsen ............................ 376/440 |
| 3,992,259 | 11/1976 | Anthony et al. . |
| 4,036,692 * | 7/1977 | Walton ........................... 376/446 |
| 4,038,137 | 7/1977 | Pugh . |
| 4,094,558 * | 6/1978 | Christiansen ................. 376/353 |
| 4,364,901 | 12/1982 | Feutrel . |
| 4,418,036 | 11/1983 | Gjertsen et al. . |
| 4,499,047 | 2/1985 | Borrman et al. . |
| 4,560,532 | 12/1985 | Barry et al. . |
| 4,578,241 | 3/1986 | Borrman et al. . |
| 4,587,093 | 5/1986 | Borrman et al. . |
| 4,588,550 | 5/1986 | Blomstrand et al. . |
| 4,632,804 | 12/1986 | Wallander et al. . |
| 4,652,426 | 3/1987 | Boyle et al. . |
| 4,666,664 | 5/1987 | Doshi . |
| 4,683,117 | 7/1987 | Carlson et al. . |
| 4,708,846 * | 11/1987 | Patterson et al. ............ 376/444 |

FOREIGN PATENT DOCUMENTS

| | | | |
|---|---|---|---|
| 3533317 A1 | 3/1987 | (DE) . | |
| 3533317 * | 3/1987 | (DE) | ............. 376/444 |
| 40 41 349 * | 6/1992 | (DE) | ............. 376/444 |
| 4114004 * | 11/1992 | (DE) | ............. 376/440 |
| 0 099 323 | 1/1984 | (EP) . | |
| 924213 * | 4/1963 | (GB) | ............. 376/352 |
| 1418495 * | 12/1975 | (GB) | ............. 376/364 |
| 1217795 * | 9/1986 | (JP) | ............. 376/353 |
| 2134593 * | 6/1987 | (JP) | ............. 376/444 |
| 1107192 * | 4/1989 | (JP) | ............. 376/444 |
| 2044290 * | 2/1990 | (JP) | ............. 376/444 |
| 3179293 * | 8/1991 | (JP) | ............. 376/444 |
| 0264291 * | 9/1992 | (JP) | ............. 376/444 |
| 5164865 * | 6/1993 | (JP) | ............. 376/440 |
| 0188167 * | 7/1993 | (JP) | ............. 376/444 |

Primary Examiner—Harvey E. Behrend
(74) Attorney, Agent, or Firm—Nixon & Vanderhye P.C.

(57) ABSTRACT

A water rod for a fuel assembly of a boiling water nuclear reactor has a first end and a second end, wherein at least one of the first and second ends is directly attachable to a tie plate of the fuel assembly without an end plug. The structure of the present invention simplifies the manufacturing process and reduces the cost of the fuel assembly in the boiling water nuclear reactor. The water rod according to the invention has one or both of its ends configured to be directly attachable to the tie plate of the fuel assembly.

1 Claim, 6 Drawing Sheets

U.S. PATENT DOCUMENTS

| | | |
|---|---|---|
| 4,749,547 | 6/1988 | Blomstrand et al. . |
| 4,795,608 | 1/1989 | Nylund . |
| 4,895,697 | 1/1990 | Andersson et al. . |
| 5,023,047 * | 6/1991 | Nishida et al. ............... 376/444 |
| 5,180,550 * | 1/1993 | Nylund ............................ 376/353 |
| 5,251,246 * | 10/1993 | Matzner ............................ 376/444 |
| 5,327,471 * | 7/1994 | Meier et al. .................... 376/444 |
| 5,339,342 | 8/1994 | Meier et al. . |
| 5,432,829 * | 7/1995 | Aoyama et al. ................ 376/444 |

* cited by examiner

WATER ROD IN A FUEL ASSEMBLY OF A BOILING WATER NUCLEAR REACTOR

This is a Continuation of application Ser. No. 08/542,253, filed Oct. 12, 1995, now abandoned.

TECHNICAL FIELD

The invention relates to an water rod in a fuel assembly of a boiling water nuclear reactor and, more particularly, to a water rod that is directly attachable to the upper and lower tie plates of the fuel assembly without an end plug.

BACKGROUND

A fuel assembly in a nuclear reactor includes a matrix of parallel rods containing fissionable fuel and/or water coolant flow. These parallel rods are held at a fixed spacing by spacer meshes located intermittently along the length of the fuel assembly. The matrix of fuel rods is supported at their lower ends by a lower tie plate, which also guides the fuel rod end plugs laterally. The lower tie plate also includes flow holes to provide an inlet for coolant flow into the fuel assembly. Similarly, the top end of the rod matrix is covered by an upper tie plate that restrains the fuel rod upper end plugs laterally and provides flow holes for the exit of coolant from the fuel assembly. One or more of the water and/or fuel rods is used as a structural member that is attached to both the lower and upper tie plates and serves the purpose of carrying a structural load of the assembly and maintaining a fixed distance between the lower and upper tie plates.

Prior designs using the water rod as the structural member typically have complex assemblies including members to transition from a large to a smaller diameter and/or end fittings to attach to the lower and upper tie plates as illustrated in FIG. 1. Even when the water rod is not used as the structural member, the assembly is complex as shown in FIG. 2 with many of the same components.

In particular, referring to FIG. 1, a conventional water rod has a central cylindrical tube 10 secured between an upper tie plate 12 and a lower tie plate 14. The central tube 10 has a plurality of inlet flow holes 16 that allow water to be driven through the rod, thus introducing moderating material within the fuel rod matrix. An upper reducer 18 and a lower reducer 20 are welded to upper and lower end of the central tube 10 respectively. The reducers 18, 20 effectively reduce the diameter of the central tube 10 to accommodate end fittings. An upper end fitting 22 and a lower end fitting 24 are welded to the upper and lower reducer 18, 20, respectively and are configured to be secured to the upper and lower tie plate, respectively.

Referring to FIG. 2, when the water rod is not intended to be the structural member for the fuel assembly, even more intricate end fittings are coupled to the central tube for connection to the upper and lower tie plates.

DISCLOSURE OF THE INVENTION

Accordingly, it is an object of the invention to provide a water rod for a fuel assembly of a boiling water nuclear reactor that is simple in construction, inexpensive to manufacture, and that has reduced inspection requirements. It is another object of the invention to provide a water rod that is directly attachable to a tie plate of the fuel assembly without an end plug.

These and other objects and advantages of the invention are achieved by providing a water rod for a fuel assembly of a boiling water nuclear reactor that includes a first end and a second end, wherein at least one of the first and second ends is directly attachable to a tie plate of the fuel assembly without an end plug. The at least one of the first and second ends may include threads adapted to be received by a threaded aperture in the tie plate. Moreover, the at least one end may be swaged such that it comprises a narrower diameter than a remainder of the water rod. The end may be flared such that it has a diameter that is greater than a diameter of a tie plate aperture and/or keyed to prevent rotation of the water rod, or the end may be provided with one of a male and female portion of a bayonet fitting adapted to be received by the other of the male and female portion of the bayonet fitting in the tie plate.

An end insert may be disposed within the water rod at the at least one end, wherein the end insert may be provided with a plurality of flow apertures therethrough. An end cap that is attachable over the end may also be provided, and similar to the end insert, the end cap may be provided with a plurality of flow apertures therethrough.

In accordance with another aspect of the invention, there is provided a fuel assembly for a boiling water nuclear reactor that includes an upper tie plate; a lower tie plate; and a water rod having first and second ends and being supported between the upper and lower tie plates, wherein at least one of the first and second ends is directly attachable to a respective one of the upper and lower tie plates without an end plug.

BRIEF DESCRIPTION OF THE DRAWINGS

These and other aspects and advantages of the present invention will become apparent from the following detailed description of preferred embodiments when taken in conjunction with the accompanying drawings, in which.

BEST MODE FOR CARRYING OUT THE INVENTION

Figure 1:
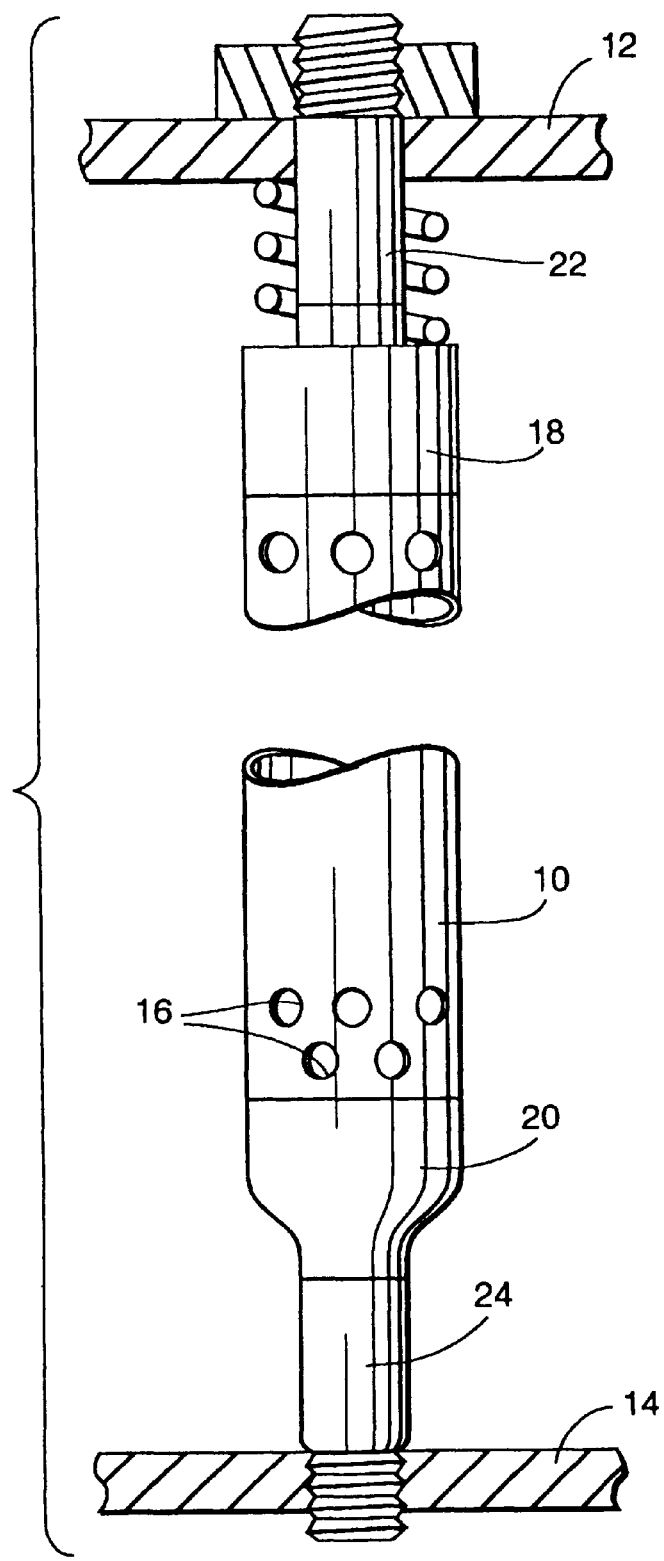
FIG. 1 illustrates a conventional water rod that is used as a structural member in the fuel assembly.
Figure 2:
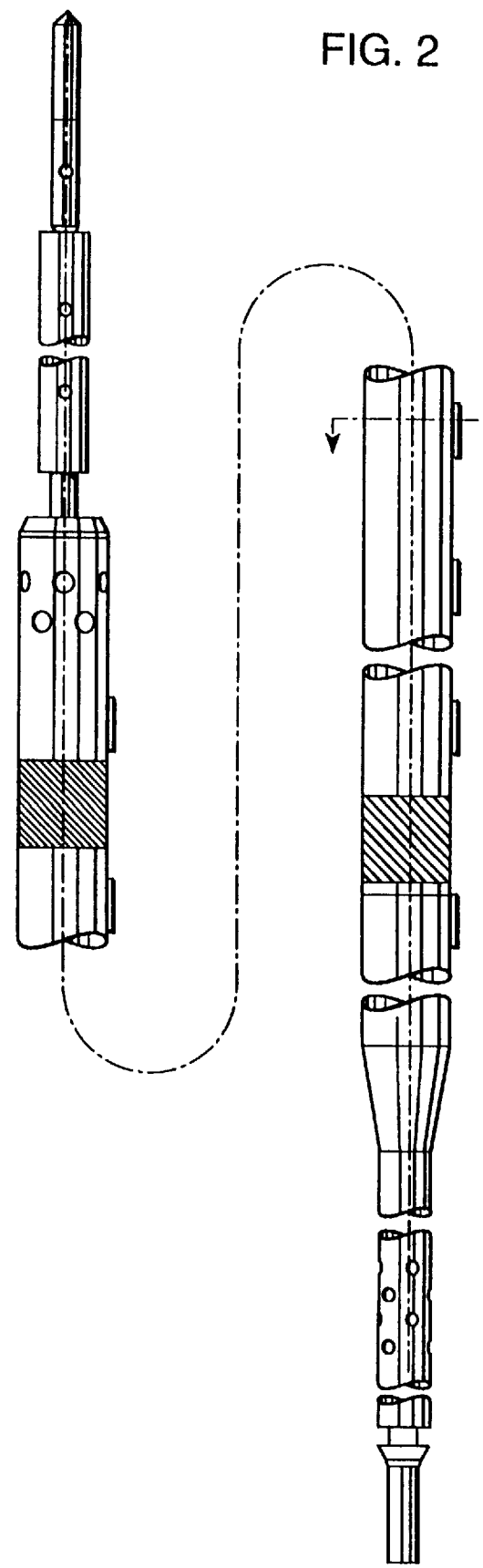
FIG. 2 illustrates a conventional water rod that is not used as the fuel assembly structural member.
Figure 3:
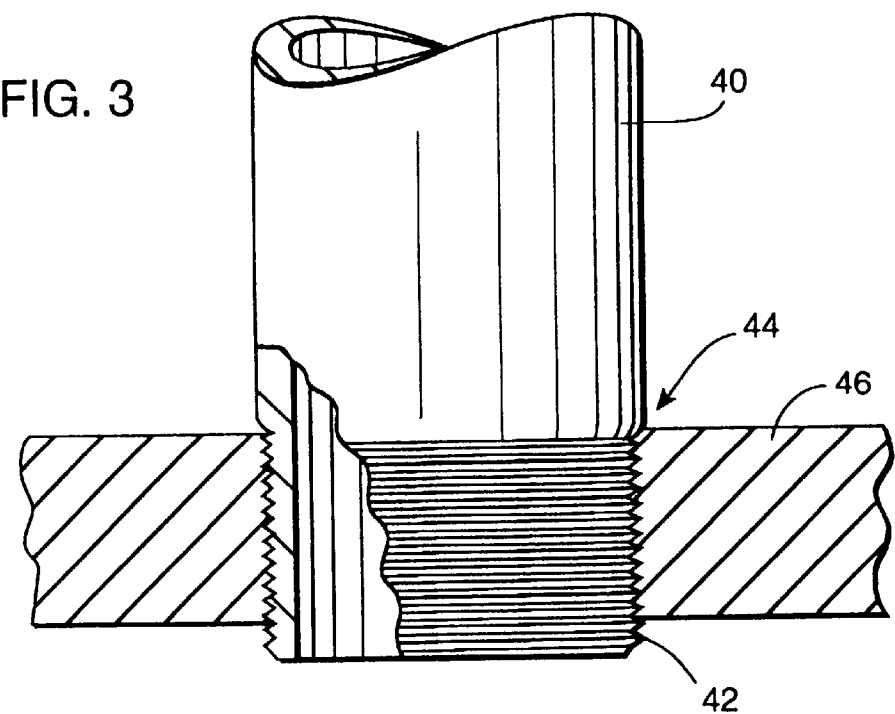
FIG. 3 illustrates a first embodiment of the water rod according to the present invention.

FIG. 3 illustrates a first preferred embodiment of the invention. In this embodiment, a water rod 40 according to the invention has one or both of its ends machined to include threads 42. The threaded end of the water rod 40 is configured to be received in a threaded aperture 44 in a tie plate 46 of the fuel assembly. The threads 42 may be formed at the ends of the water rod 40 in any known manner.

Figure 4:
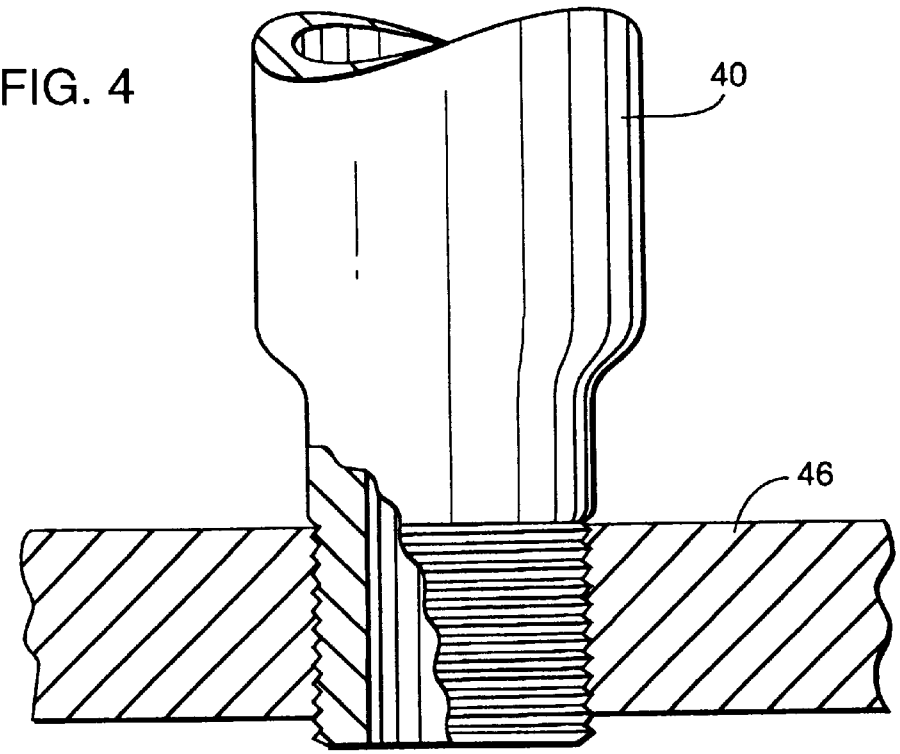
FIG. 4 illustrates a second embodiment of the water rod according to the present invention.

FIG. 4 illustrates a second embodiment of the water rod 40 according to the invention. In this embodiment, one or both ends is swaged to a narrower diameter than the remainder of the water rod 40. The swaged end or ends are then machined with threads for attachment to the tie plate 46.

Figure 5:
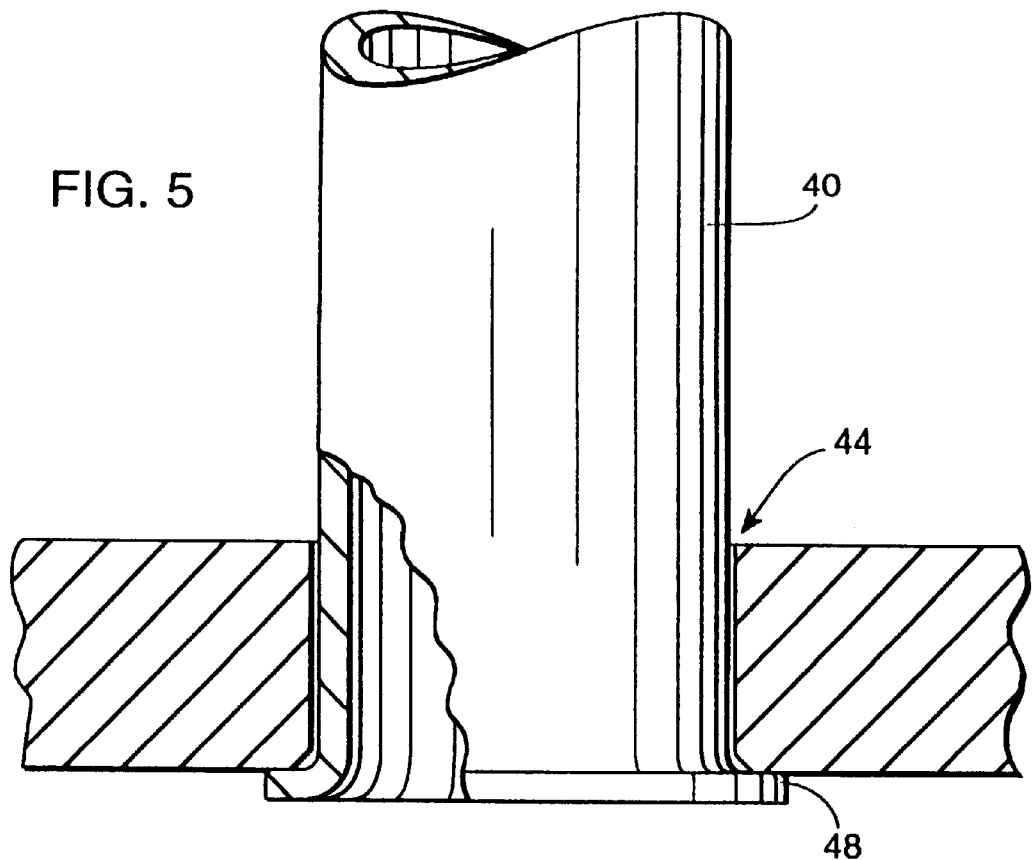
FIG. 5 illustrates a third embodiment of a water rod according to the present invention.

In a third embodiment of the invention, referring to FIG. 5, one of the water rod ends 48 is flared such that its diameter is greater than that of the tie plate aperture 44. In this embodiment, the water rod 40 must be inserted from either below the lower tie plate or above the upper tie plate. Also in this embodiment, the water rod may be keyed in a known manner to prevent the water rod from rotating.

Figure 6:
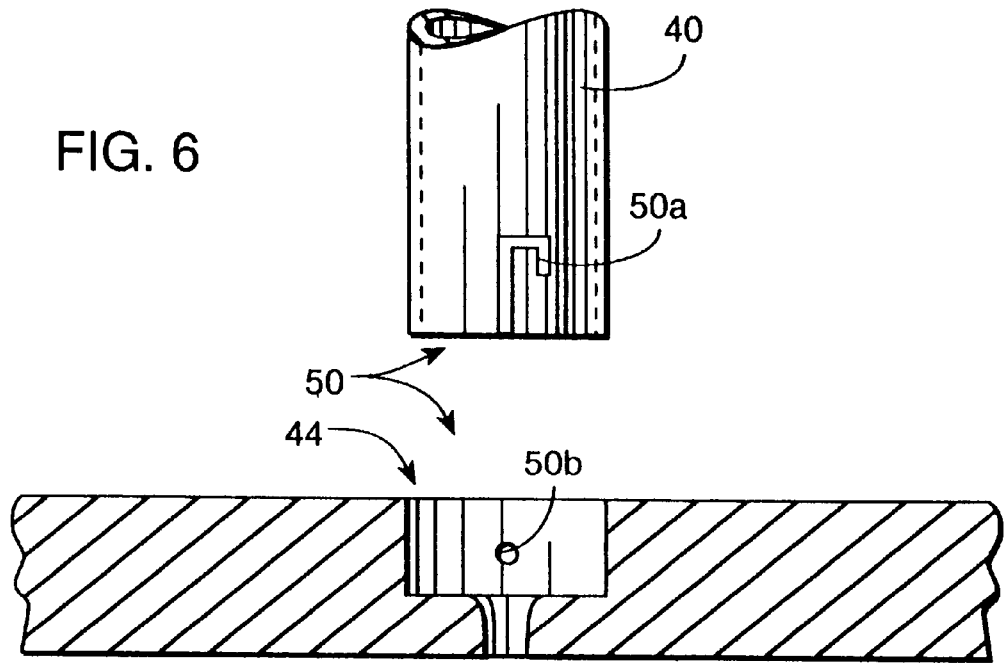
FIG. 6 illustrates a fourth embodiment of a water rod according to the present invention.

In a fourth embodiment of the invention, referring to FIG. 6, one or both of the ends of the water rod 40 may be configured with a bayonet fitting 50, including a slit 50a formed in the water rod 40 and a corresponding pin 50b in the tie plate aperture 44. Of course, the water rod 40 may be fitted with the pin 50b, and the tie plate may be configured to receive the pin in a corresponding slot 50a.

Figure 7:
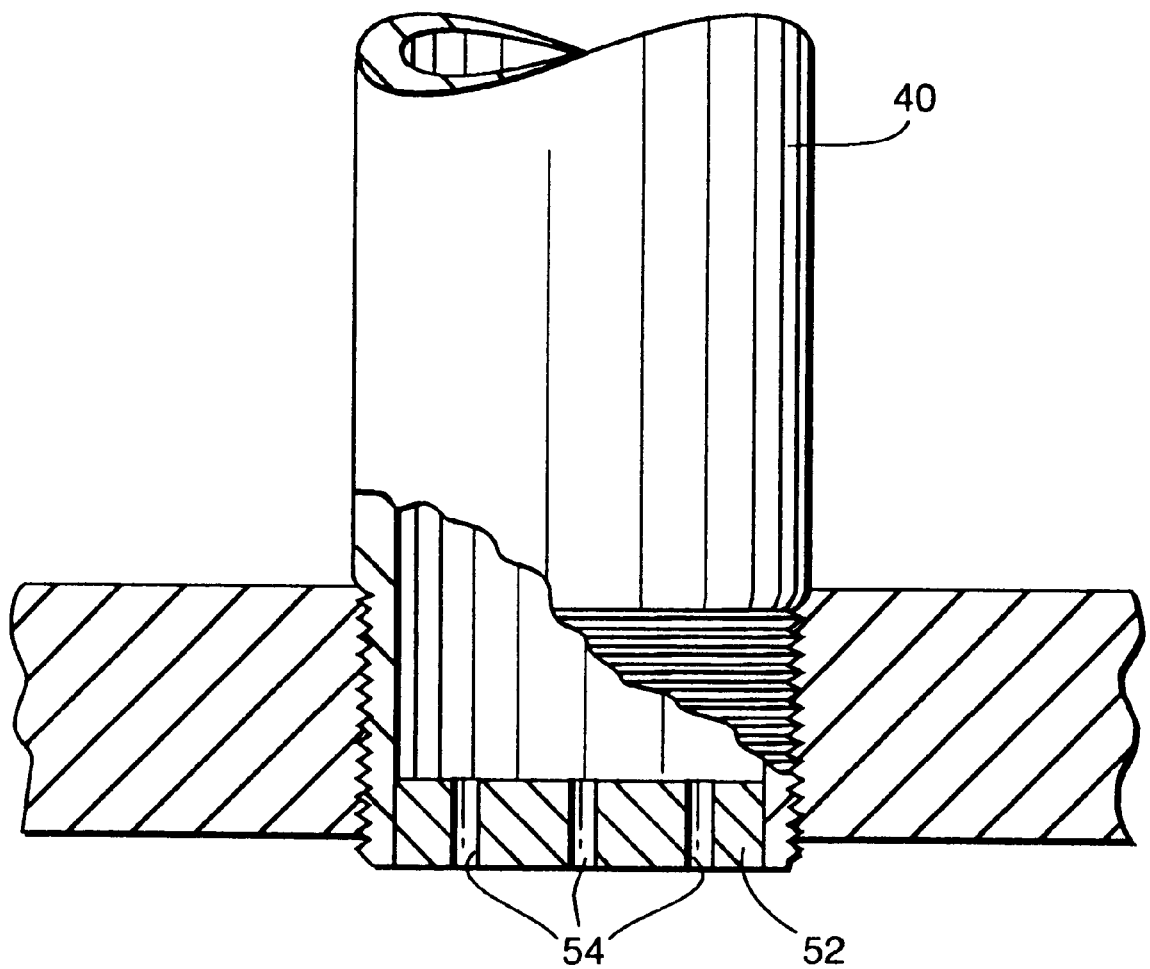
FIGS. 7 illustrates a water rod according to the present invention having an end insert.

In accordance with another aspect of the invention, referring to FIG. 7, an end insert 52 may be inserted into the water rod. The end insert 52 may be threaded into the water rod 40, press fit and secured by friction, or welded into the water rod 40. The end insert 52 may be configured to completely block flow of coolant into the water rod 40 or may be provided with flow holes 54 to regulate coolant flow and/or prevent significant debris from entering through the water rod. The end insert 52 may further serve as a filter to prevent a greater amount of debris from entering through the water rod.

Figure 8:
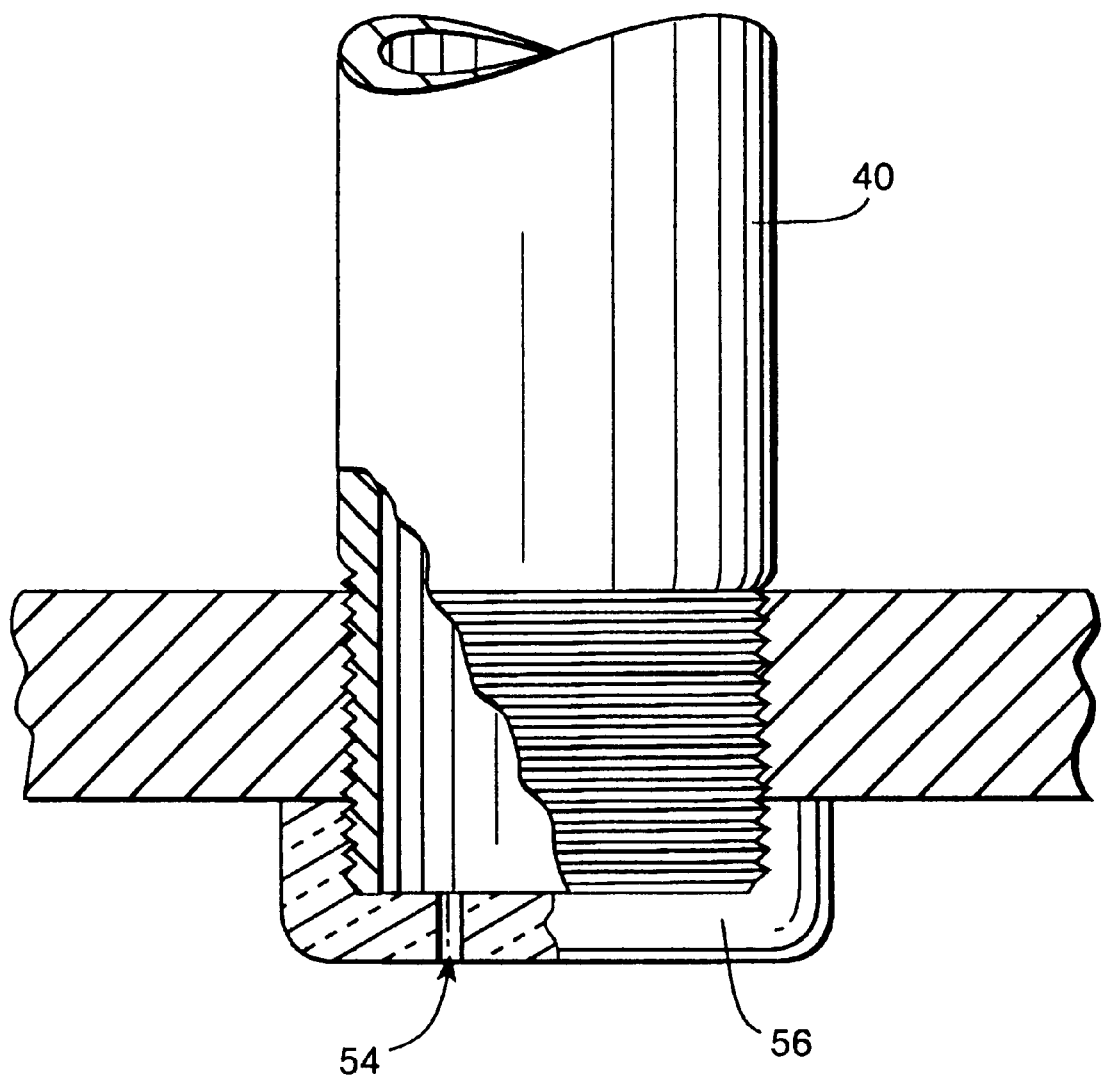
FIG. 8 illustrates a water rod according to the present invention having an end cap.

FIG. 8 illustrates an alternative to the additional aspect of the invention described in connection with FIG. 7. In particular, FIG. 8 illustrates an end cap 56 that is press fit, welded or threaded over the end of the water rod 40. Similar to the end insert 52, the end cap 56 may be closed to completely prevent coolant flow through the water rod 40, or the end cap 56 may include flow holes 54 and/or serve as a filter for debris.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A fuel assembly for a boiling water nuclear reactor, comprising:

an upper tie plate;

a lower tie plate; and a water rod having first and second ends and being supported between said upper and lower tie plates, at least one of said first and second ends comprising threads and being directly threadedly attached to a respective one of said upper and lower tie plates without an end plug; and an end cap attached to said water rod over said at least one of said first and second ends, which extends through the tie plate a sufficient distance to allow the end cap to be attached thereto.

* * * * *